(12) United States Patent
Bortis et al.

(10) Patent No.: US 10,819,241 B2
(45) Date of Patent: Oct. 27, 2020

(54) ISOLATED DC/DC CONVERTER FOR CONTROLLING POWER FLOWS BETWEEN THREE DC TERMINALS

(71) Applicant: Robert Bosch GmbH, Stuttgart (DE)

(72) Inventors: Dominik Bortis, Zürich (CH); Jannik Robin Schaefer, Wädenswil (CH); Johann W. Kolar, Zürich (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/605,579

(22) PCT Filed: Mar. 27, 2018

(86) PCT No.: PCT/EP2018/057755
§ 371 (c)(1),
(2) Date: Oct. 16, 2019

(87) PCT Pub. No.: WO2018/192754
PCT Pub. Date: Oct. 25, 2018

(65) Prior Publication Data
US 2020/0076311 A1 Mar. 5, 2020

(30) Foreign Application Priority Data

Apr. 19, 2017 (DE) ........................ 10 2017 206 579

(51) Int. Cl.
*H02M 3/335* (2006.01)
*H02M 1/00* (2006.01)
*H02M 7/217* (2006.01)

(52) U.S. Cl.
CPC ... *H02M 3/33561* (2013.01); *H02M 3/33584* (2013.01); *H02M 7/217* (2013.01);
(Continued)

(58) Field of Classification Search
CPC ....... H02M 2001/0074; H02M 1/0077; H02M 2001/0064; H02M 3/33561; H02M 3/33569; H02M 3/33576
See application file for complete search history.

(56) References Cited

U.S. PATENT DOCUMENTS 9,762,143 B2 * 9/2017 Matsuoka ................ H02M 1/32
9,825,556 B2 * 11/2017 Rodriguez .......... H02M 7/4807
(Continued)

FOREIGN PATENT DOCUMENTS

| CN | 203574386 U | * | 4/2014 |
| CN | 108347051 A | * | 7/2018 |
| EP | 2966740 | | 1/2016 |

OTHER PUBLICATIONS

Machine English translation of CN 108347051, Ma,Fujun, Hybrid multi-port power electronic power regulator, Jul. 31, 2018 (Year: 2018).*

(Continued)

*Primary Examiner* — Thienvu V Tran
*Assistant Examiner* — Sisay G Tiku
(74) *Attorney, Agent, or Firm* — Michael Best & Friedrich LLP

(57) ABSTRACT

A converter for controlling power flows between three electricity networks with different operating voltages. The converter includes, in one implementation, three terminals and two converter cells. Each of the three terminals are configured to electrically contact-connect one of the three electricity networks. Each of the two converter cells includes a transformer having three converter cells. One of the terminals is connected to a series circuit of the converter cells. Another of the terminals is connected to a parallel circuit of the converter cells.

10 Claims, 6 Drawing Sheets

(52) U.S. Cl.
CPC ............... *H02M 2001/008* (2013.01); *H02M 2001/0064* (2013.01); *H02M 2001/0074* (2013.01); *H02M 2001/0077* (2013.01)

(56) References Cited

U.S. PATENT DOCUMENTS

| | | | | |
|---|---|---|---|---|
| 10,003,251 | B2* | 6/2018 | Wu | H02M 1/15 |
| 10,340,804 | B2* | 7/2019 | Inoue | H02M 3/005 |
| 2008/0238214 | A1* | 10/2008 | Barbosa | H02M 7/483 |
| | | | | 307/113 |
| 2009/0231896 | A1* | 9/2009 | Barbosa | H02M 7/49 |
| | | | | 363/131 |
| 2013/0201733 | A1* | 8/2013 | Divan | H02M 5/225 |
| | | | | 363/39 |
| 2014/0204643 | A1* | 7/2014 | Wagoner | H02M 3/1584 |
| | | | | 363/132 |
| 2015/0123612 | A1* | 5/2015 | Ide | H02M 7/08 |
| | | | | 320/109 |
| 2016/0016479 | A1* | 1/2016 | Khaligh | H02M 1/4258 |
| | | | | 363/17 |
| 2019/0238050 | A1* | 8/2019 | Jimichi | H02M 3/33592 |

OTHER PUBLICATIONS

Machine English translation of CN 203574386, Wang, Zheng, Multilevel multiport power generation and energy storage hybrid apparatus, Apr. 30, 2014 (Year: 2014).*

International Search Report for Application No. PCT/EP2018/057755 dated Jun. 27, 2018 (English Translation, 3 pages).

Farhangi, B. et al., "A novel vehicular integrated power system realized with multi-port series ac link converter," 2015 IEEE Applied Power Electronics Conference and Exposition (APEC), IEEE, Mar. 15, 2015, pp. 1353-1359.

Li, B. et al., "Bi-directional on-board charger architecture and control for achieving ultra-high efficiency with wide battery voltage range," 2017 IEEE Applied Power Electronics Conference and Exposition (APEC), IEEE, Mar. 26, 2017, pp. 3688-3694.

Schafer, J. et al., "Multi-port multi-cell DC/DC converter topology for electric vehicle's power distribution networks," 2017 IEEE 18th Workshop on Control and Modeling for Power Electronics (COMPEL), IEEE, Jul. 9, 2017, pp. 1-9.

* cited by examiner

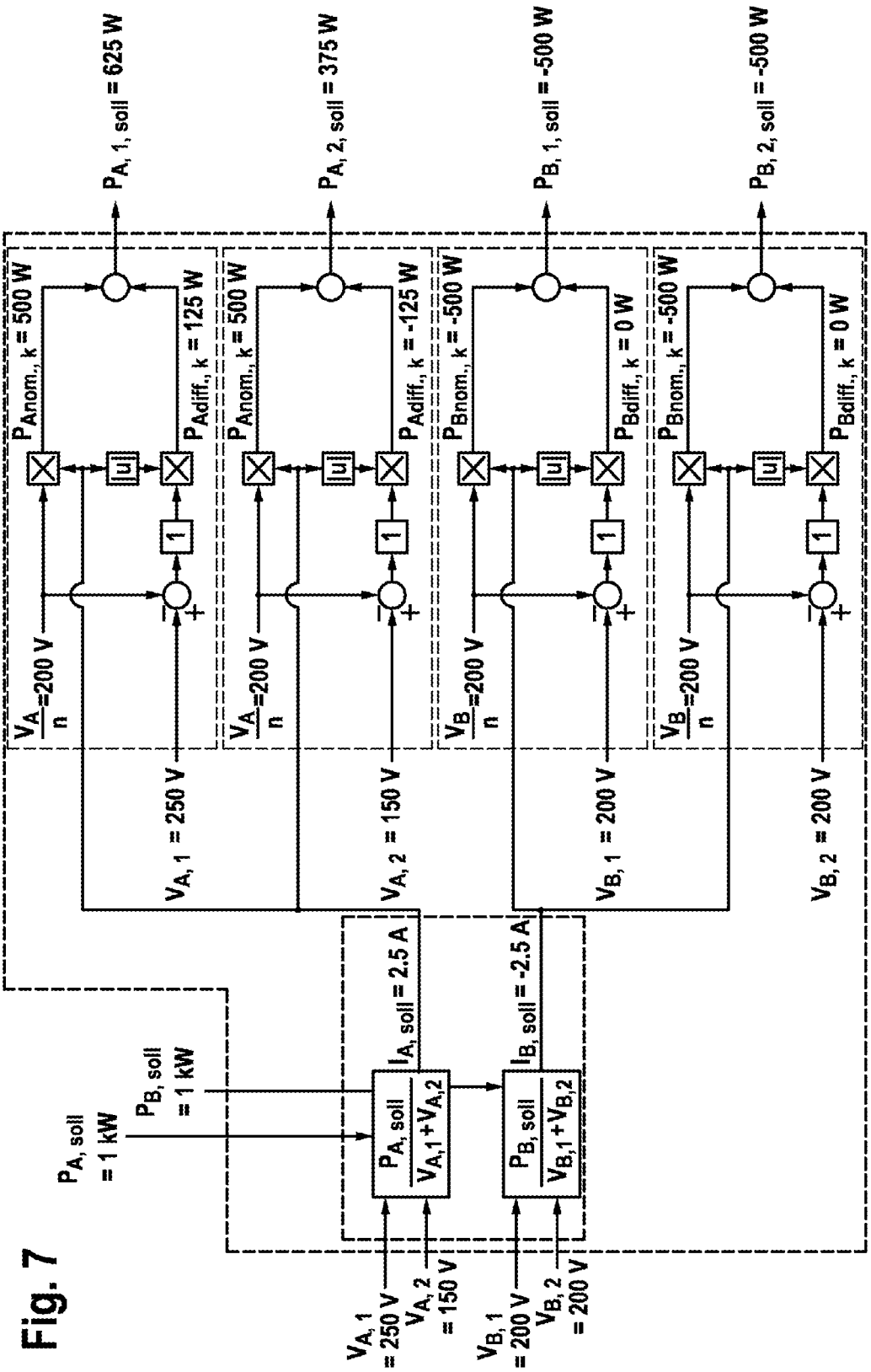

ISOLATED DC/DC CONVERTER FOR CONTROLLING POWER FLOWS BETWEEN THREE DC TERMINALS

BACKGROUND OF THE INVENTION

The converter described here is able to be used, in particular, in the field of power electronics. Said converter is, in particular, a converter that makes possible omnidirectional power flows between three DC-isolated DC voltage sources. In this context, the term "omnidirectional" means that a power flow between the various DC sources in any direction and in a wide power range can be controlled by means of the converter.

In modern electric as well as hybrid vehicles, two different on-board power supply systems are usually used: on the one hand, there is a low-voltage system (LV system), which is buffer-stored by way of a storage battery and supplies power to all low-voltage consumers such as on-board computers, lighting units and entertainment electronics. On the other hand, there is a high-voltage system (HV system), which is fed by way of a high-voltage storage battery and provides energy both for the drive and for the low-voltage system.

To transmit the energy from the HV system to the LV system, a DC/DC converter (DC=direct current) is usually used, said DC/DC converter having to have DC isolation for safety reasons. For the successful operation of an electric or hybrid vehicle, the storage batteries must furthermore be able to be charged by means of an electricity supply system (AC system). This requires an additional AC/DC converter (AC=alternating current), which, on the part of the electricity supply system, is preferably suitable both for the operation using single-phase alternating current and for the operation using three-phase alternating current. DC isolation must likewise be provided here for reasons of safety. For the embodiment of the AC/DC converter with DC isolation, said AC/DC converter is typically embodied with a non-isolated AC/DC rectifier and a downstream DC/DC converter with DC isolation. In modern electric and hybrid vehicles, ultimately there are therefore usually three DC-isolated DC voltage systems, namely an electricity supply system (AC system), by means of which an electricity supply system can be connected, the HV system and the LV system.

The power flow between said three DC voltage systems is therefore usually provided by way of two independent DC-isolated DC/DC converters as described above. Therefore, on the one hand, the total power required by the AC system to charge the LV system by way of the LV storage batteries must be led through at least two DC/DC converters depending on the interconnection of the converters. On the other hand, various circuit parts are installed in duplicate owing to the interconnection of the two independent DC-isolated DC/DC converters. These include, for example, electronic changeover switches or transformers. The term "electronic changeover switches" means in this case, in particular, bridge branches implemented by way of power semiconductors, wherein two bridge branches form a full-bridge. This leads both to a poorer overall efficiency of the system and to increased production costs and low power density due to low system integration.

SUMMARY OF THE INVENTION

The intention is to describe here a converter for controlling power flows. Said converter is a converter for controlling power flows between at least three electricity networks, with different operating voltages, comprising at least three terminals, which are each configured to electrically contact-connect one of the three electricity networks, and at least two converter cells with a transformer having at least three transformer coils, wherein at least one of the terminals is connected to a series circuit of transformer coils of various converter cells, whereas at least another of the terminals is connected to a parallel circuit of transformer coils of various converter cells.

The converter described here is particularly suitable for controlling power flows between AC system, HV system and LV system in an electric motor vehicle or a hybrid motor vehicle. The converter can also be referred to, in particular, as a "multi-port converter" because it has more than two terminals for various electricity networks.

By using a converter to electrically connect AC system, HV system and LV system, the power density can be increased significantly. The simplest case of a multi-port converter is a three-port converter. Such a converter also provides, in particular, DC isolation of different voltage levels coupled to the converter.

The converter described here has at least two converter cells. A single converter cell is, considered individually, likewise a converter and preferably a three-port converter (multi-port converter with three ports for different electricity networks). Such a converter cell usually has three ports, three full-bridges and a transformer with three transformer coils (or else windings), wherein the transformer coils or windings are each associated with one of the three ports. The transformer usually comprises a core on which the at least three windings are arranged.

The full-bridges make it possible to connect the respective ports in a targeted manner to the associated windings in various provided ways. The full-bridges, consisting of in each case four transistors, can interrupt (zero voltage at the output), transmit or transmit in an inverted manner the voltage transmission and power transmission between the port and the associated winding depending on the actuation. A positive voltage is generated at the output by a "normal" transmission. A negative voltage is generated at the output by an inverted transmission. The output voltages of the full-bridges are applied to the respective transformer windings directly, as a result of which a power exchange between the different ports is made possible. The full-bridges are able to be operated at a prescribable duty cycle in order to adjust a specific power transmission by way of the full-bridges. In one preferred embodiment variant, the full-bridges are configured for a fixed duty interval. The duty cycle specifies for which time interval within the duty interval a power transmission is possible. The full-bridges are preferably configured such that a "normal" transmission and an inverted transmission takes place in alternation. The full-bridge can then also be used to adapt an AC signal with a square-wave voltage. The duty intervals of individual full-bridges of a converter cell or various converter cells may be temporally shifted with respect to one another. Said shift is a phase shift. The phase shift can be used, for example, to process polyphase alternating currents. Particularly in the case of converter cells connected in parallel with one another, the phase shift can also be used to ensure a particularly uniform operation of the converter overall because the power transmissions of various converter cells can then be arranged in a temporally offset manner. The entire converter obtains a particularly uniform power transmission characteristic with minimum voltage and power fluctuations as a result.

The power flow is regulated both by the duty cycle of the output voltages of the full-bridges and by the phase shift thereof with respect to one another.

Ports of the overall converter are denoted in the following text by $P_A$, $P_B$, $P_C$, .... Ports of the individual converter cells (first converter cell, second converter cell, third converter cell, ... ) are referred to in the following text additionally with an index k for the individual converter cell: $P_{A,k}$, $P_{B,k}$, $P_{C,k}$ ....

However, an individual converter cell is greatly restricted with respect to the value ranges of the individual port voltages and with respect to the voltage differences between same. This holds true, in particular, on account of the converter efficiency required. This is due to the fact that a deviation from a rated voltage level for which the respective multi-port converter is configured typically leads to a reduction in the efficiency of the energy transmission. This significantly complicates the use of an individual converter cell in automotive applications with greatly different and variable storage battery voltages. On the one hand, high currents have to be conducted on the LV side in the case of high powers. This can lead to considerable switching overvoltages and switching losses in the power transistors due to the parasitic leakage inductances of the transformer windings and due to parasitic inductances of the wiring of the power transistors (commutation loops).

On the other hand, transistors with high blocking voltages and which have poorer properties with respect to switching losses and conductivity losses in comparison to transistors with lower blocking voltages have to be used on the HV-system side. For this reason, the optimum converter switching frequency would have to be reduced. Consequently, the volume of the mentioned components would have to be at least partly designed to be greater.

A further challenge is posed by the high voltage transformation ratio between the HV system and the LV system. Said high voltage transformation ratio is a significant challenge, in particular, when designing the transformer because it requires a high winding number ratio.

A multi-cell approach is known from two-port converter systems consisting of converter cells each having two coils and two terminals, which couple only two voltage sources with greatly different voltage levels to one another. In this case, the ports are connected either in series or in parallel by a plurality of identical subsystems (in the following text called cells or also converter cells), whereby each cell must transmit only a portion of the total power or is situated at a portion of the high voltage.

The converter presented here is a multi-port multi-cell converter (in the following text also MPMC converter), which combines the concept of a multi-port converter cell and a multi-cell converter with one another. Said converter makes it possible to couple a plurality of DC voltage systems of greatly different voltage levels efficiently with a low degree of design complexity.

This is achieved by virtue of a plurality of identical multi-port converter cells (in particular a plurality of three-port cells) being designed for lower powers and being interconnected with one another according to the voltage and current ratios at the respective ports thereof. This means that on the HV side the ports of the individual three-port cells are connected in series for the (symmetrical) voltage distribution and on the LV side the ports are connected in parallel within the context of a (symmetrical) distribution of the high output current.

On the LV side, all ports of the converter cells of the converter are particularly preferably interconnected in parallel with one another. That is to say all converter cells are used to provide the low voltage on the LV side. Distributing the total current across the various parallel cell ports achieves a particularly high efficiency.

Essential advantages become apparent through the use of the multi-port multi-cell concept (MPMC concept). The power that is to be transmitted is distributed symmetrically across a plurality of rows, as a result of which either the port voltages or the port currents of the respective cells can be reduced. This leads to a lower winding number ratio and to an increase in the LV-system-side characteristic impedance of the individual converter cells, which makes possible both an improved transformer design and a reduction in the transistor switching losses on the LV-system side.

The distribution of the high voltage across a plurality of series-connected ports of a plurality of converter cells makes it possible to use transistors with lower blocking voltages and therefore leads to an improved figure of merit, that is to say improved properties with respect to switching and conduction losses. The higher switching frequency that is able to be achieved as a result reduces the volume of the passive components, which may be further reduced by virtue of the various cells not being clocked synchronously but being actuated with a specific phase shift. The superposition of the port currents of each cell therefore leads to a reduced current ripple in capacitors used at the ports of the converter for voltage support, as a result of which said capacitors have either a higher expected lifetime or the capacitance values thereof can be reduced.

It is preferred that all individual converter cells of the converter are of the same design. From an industrial point of view, this design or this topology is attractive because the development of an individual converter cell is sufficient in order to manufacture converter systems for a wide variety of power and voltage levels without a large amount of additional development outlay. This leads to a positive scale effect, which makes it possible to produce various converter systems that are all based on the same converter cell in a cost-effective manner.

The converter is preferably designed or regulated in such a way that both the high input voltages and the high output currents are distributed symmetrically across the individual cells. To this end, the converter preferably has a regulator superordinate to the converter cells. This ensures that each cell has to deliver the same proportion of the total power and therefore also the losses are distributed equally in the converter. Furthermore, the full-bridges in the various cells are actuated accordingly with a phase shift that is dependent on the number of cells. The converter preferably has capacitors $C_A$, $C_B$, $C_C$, by way of which the total current ripple at the terminals of the converter in the output capacitors can be reduced by the superposition of the individual cell currents.

In contrast to a converter having a two-port multi-cell topology, automatic balancing of the port voltages $V_{A,k}$ and $V_{B,k}$ k e $\{1, \ldots, n\}$ is not specified for the present MPMC topology. Therefore, active regulation of said voltages should be carried out by way of a superordinate regulator. Neglecting the converter losses, for the sum of the powers at the three terminals or ports the following holds true $P_A+P_B+P_C=0$, as a result of which only two of these powers are able to be selected freely.

Each converter cell preferably has its own (internal) cell regulator. For the distribution of the powers in a single converter cell, it likewise holds true that the sum of the powers at the individual terminals must be zero ($P_{x,A}+P_{x,B}+P_{x,C}=0$). Each cell is controlled by its own internal regulator.

At least one of the regulators (the superordinate regulator and or at least one cell regulator) is configured to calculate five different parameters based on the desired distribution of the power across the individual ports ($P_A$, $P_B$, and $P_C$). This holds true, in particular, for the cell regulators, which are preferably all configured accordingly. In one preferred embodiment variant, the superordinate regulator is not configured to specify said five different parameters accordingly. Instead, the superordinate regulator is configured to specify port powers for the individual cell regulators ($P_{A,K}$, $P_{B,k}$, and $P_{C,k}$). The individual cell regulators are then configured to fulfil a common (superordinate) specification of the superordinate regulator.

The five parameters are preferably the following parameters:

$D_A$, duty cycle at the converter input A
$D_B$, duty cycle at the converter input B
$D_C$, duty cycle at the converter input C
$\Phi_{AB}$ phase shift angle between the converter inputs A and B, and
$\Phi_{AC}$ phase shift angle between the converter inputs A and C.

The full-bridges are able to be fully controlled by five parameters with the aid of the regulator. In fact, the phase shift angle $\Phi_{BC}$ between the converter inputs B and C also exists as a sixth parameter. However, this is completely dependent on the phase shift angles $\Phi_{AB}$ and $\Phi_{AC}$ and does not need to be specified separately for this reason.

In the following text, the mode of operation of the converter is intended to be explained in even more detail based on concrete examples. In the case of a negative power at a series-interconnected port of the converter and an excessively high capacitor voltage at the capacitor of said port, the power fed to the capacitor must be reduced to effect a reduction in the port voltage. Correction terms for the power distributions of the individual cells are now determined by a superordinate converter ($P_{Adiff,k}$, $P_{Bdiff,k}$ and $P_{Cdiff,k}$). In order to prevent destabilization of the entire converter despite different cell powers of the individual converter cells, the sum of the cell-internal correction terms $P_{Adiff,k} + P_{Bdiff,k} = -P_{Cdiff,k}$ is compensated by means of the parallel-connected LV port. This is a further advantage when all converter cells are connected in parallel on the LV side or at the LV system. The LV system can thus also be used simultaneously to stabilize the individual cell powers by virtue of power differences between the individual cells being balanced.

This is possible, in particular, because, in contrast to the series-interconnected ports, an asymmetrical power distribution in the parallel-connected cell ports does not result in a change in the ratio between the respective port voltages and therefore no destabilization of the converter results. Such a stabilizing effect would not be able to be brought about using purely series-interconnected cells because three cell-internal port voltages would have to be regulated there but would have available only two degrees of freedom (port powers) for regulating the cell voltages. For this reason, for a stable operation of the described multi-port multi-cell converter, it is inevitable that at least one port of the converter cells is interconnected in parallel, via which the power differences between the cells can be balanced.

Due to the voltage-proportional redistribution of the cell powers, nothing changes in the total power of the converter because the reduction of the port power by a determined value in one converter cell leads to an increase in the port power in another converter cell by precisely the same value.

BRIEF DESCRIPTION OF THE DRAWINGS

The invention and the technical field are explained in more detail in the following text based on the figures. It should be noted that the figures are in each case only schematic, in which:

FIG. 7: shows an example of the behavior of the converter in the case of changes in voltage and power.

DETAILED DESCRIPTION

Figure 1:
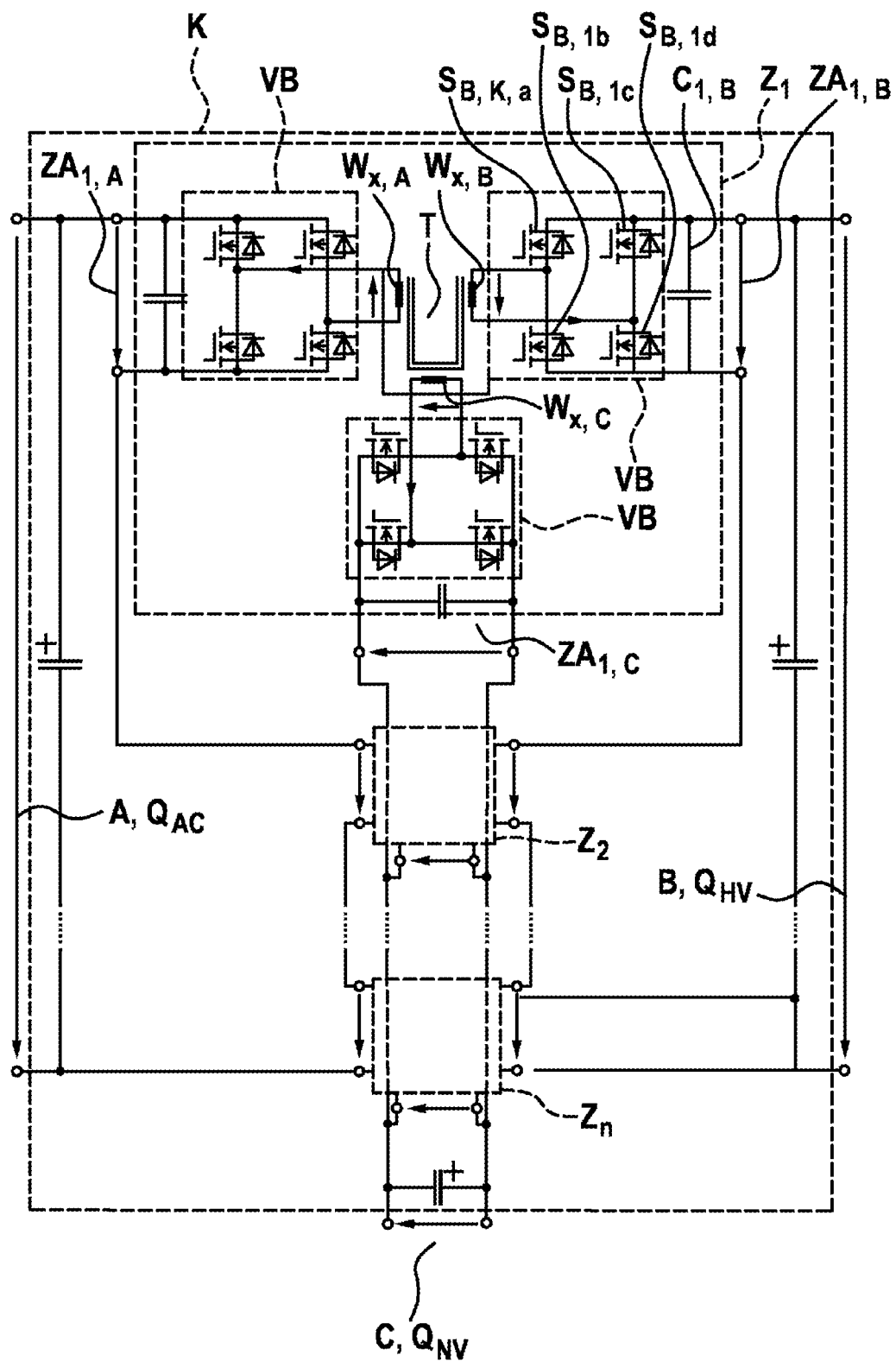
FIG. 1: shows a circuit diagram of a converter having a described multi-port multi-cell arrangement.

The presented multi-port multi-cell topology of a converter K makes omnidirectional power flow possible between three DC-isolated DC voltage sources. Said topology preferably consists of a plurality of identical three-port cells $Z_{1,2,n}$, which are interconnected either in series or in parallel depending on the level of the applied port voltages of the overall system. FIG. 1 shows the converter K having a plurality of cells $Z_{1,2,n}$. The converter K has three terminals A, B and C, wherein terminal A is associated with an electricity system $Q_{AC}$, terminal B is associated with a high-voltage system $Q_{HV}$ and terminal C is associated with a low-voltage system $Q_{NV}$.

Each cell consists of three full-bridges VB and a transformer T having three windings—$W_{x,A}$, $W_{x,B}$, $W_{x,C}$ or transformer coils and three cell terminals $ZA_{x,A}$, $ZA_{x,B}$ and $ZA_{x,C}$. In this case, the first index "x" stands for the number of the respective converter cell and the second index "A, B, C" stands for the individual terminals of the converter cell denoted by "x". The cell terminals $ZA_{x,A}$, $ZA_{x,B}$ and $ZA_{x,C}$ are able to be electrically connected to a respective associated winding by way of the full-bridges VB in order to connect the transformer coils $W_{x,A}$, $W_{x,B}$, $W_{x,C}$. The full-bridges VB each have a circuit having four transistors/circuit breakers $S_{B,ka}$, $S_{B,kb}$, $S_{B,kc}$ and $S_{B,kd}$, wherein in this case the first index (here for example "B") in each case stands for the individual cell terminal, the index k stands for the respective converter cell and the last index a, b, c stands for the individual circuit breaker of the respective full-bridge VB. By way of example, said transistors/circuit breakers are shown in this case only for the full-bridge VB at the cell terminal $ZA_{1,B}$. However, all full-bridges at all cell terminals $ZA_{x,A/B/C}$ are of a corresponding design.

Figure 2:
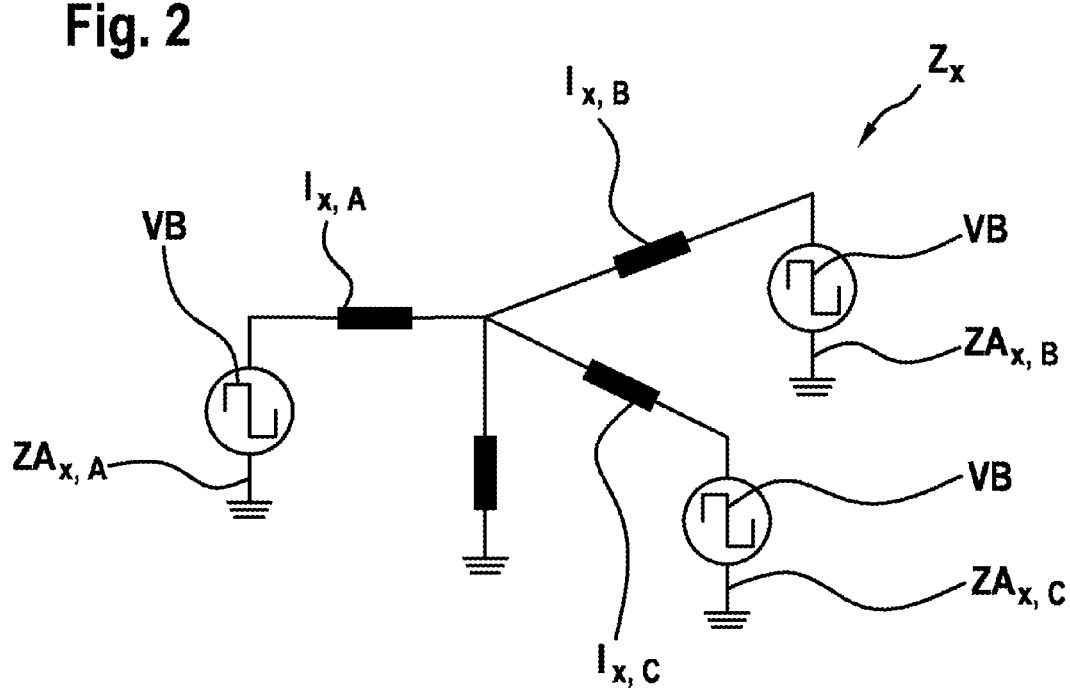
FIG. 2: shows an equivalent circuit diagram of a converter cell.

FIG. 2 shows an equivalent circuit diagram of a converter cell of the converter. The transformer and the transformer coils or windings in this case form the inductances Ix,A, Ix,B and Ix,C. The full-bridges VB and the cell terminals $ZA_{x,A}$, $ZA_{x,B}$ and $ZA_{x,C}$ are illustrated here in a schematic manner analogously to FIG. 1.

Figure 3:
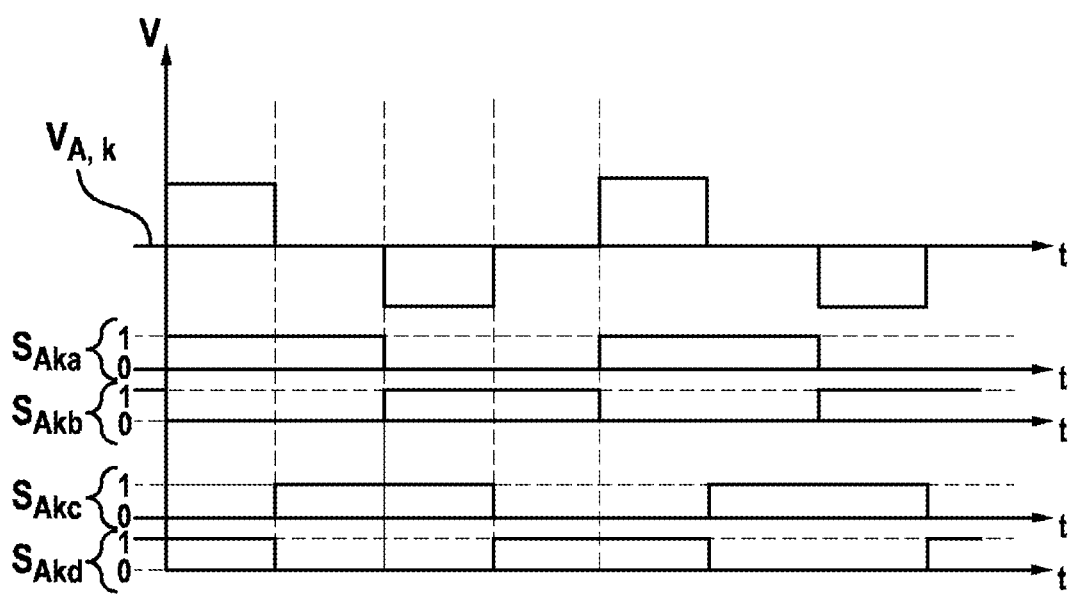
FIG. 3: shows an illustration of the mode of operation of a full-bridge.

FIG. 3 shows how voltage and current forms can be adjusted by means of an individual full-bridge of a converter cell. In this case, by using the individual transistors of the full-bridge, a voltage profile that provides an alternating current by square-wave signals is generated.

In the bottom part of FIG. 3, the switching positions of the four transistors/circuit breakers $S_{Aka}$, $S_{Akb}$, $S_{Akc}$ and $S_{Akd}$ of the full-bridge are illustrated, wherein in each case 1 defines an open state and 0 defines a closed state of the respective transistor/circuit breaker. The index "A" of the respective cell terminal is selected here purely by way of example. A square-wave AC voltage $V_{A,k}$ is generated from an input signal having a uniform input voltage with the aid of said circuit of transistors of the full-bridge, said AC voltage being illustrated in the upper part of FIG. 3.

Figure 4A:
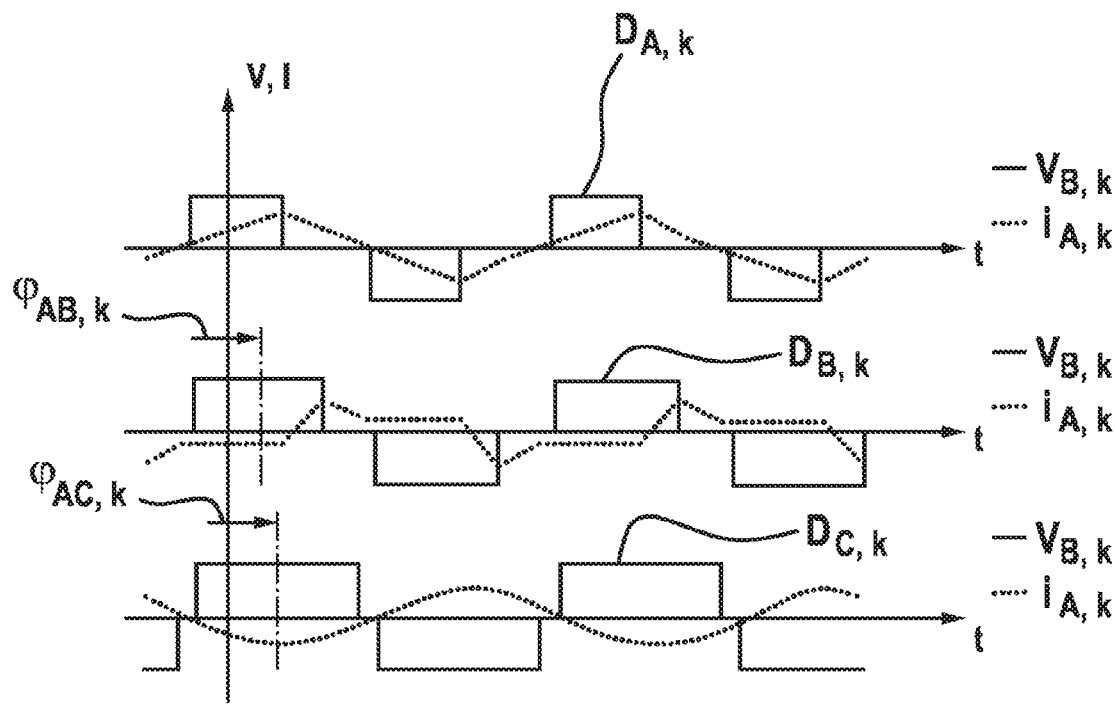
FIG. 4: shows an illustration of the phase-shifted operation of a plurality of converter cells.
Figure 4B:
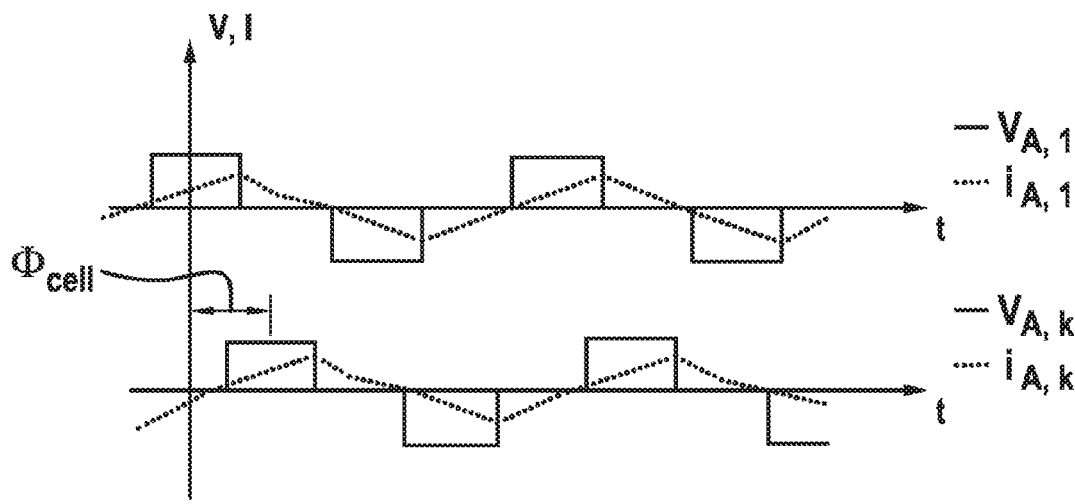

FIG. 4 illustrates the operation of converter cells. In the upper part (a) of FIG. 4, the voltages $V_{A,k}$, $V_{B,k}$, and $V_{C,k}$ and currents $i_{A,k}$, $i_{B,k}$, and $i_{C,k}$ applied to the three cell terminals of a converter cell during the operation of the converter cell are plotted over time. The voltages are in each case AC voltages, which are generated by the operation of the full-bridges according to FIG. 3. It can be seen that the time intervals in which a voltage is applied to the three cell terminals are each of different length. This is achieved with the aid of the use of the duty cycles $D_{A,B,C}$. It can further be seen that the time intervals in which a voltage is applied are shifted with respect to one another. This is achieved by the phase shifts $\Phi_{AB,k,\ AC,k}$. With the aid of the individual full-bridges of the converter cell, AC voltages phase-shifted with respect to one another are transferred to the individual transformer coils of the converter cell using the duty cycles $D_{A,B,C}$ and the phase shifts $\Phi_{AB,\ AC}$, said transformer coils effecting the desired power distribution between the cell terminals ($P_{A,k}+P_{B,k}+P_{C,k}=0$).

In the lower part (b) of FIG. 4, the voltage profiles at two identical cell terminals of different converter cells are illustrated. The individual full-bridges of the different converter cells are preferably operated such that a cell phase shift Φcell is achieved here. A particularly low current and voltage ripple can thus be achieved in the output capacitors or the output terminals A, B and C of the converter overall, as a result of which the capacitance of the output capacitors for a specific required maximum output voltage ripple can be reduced.

Figure 5:
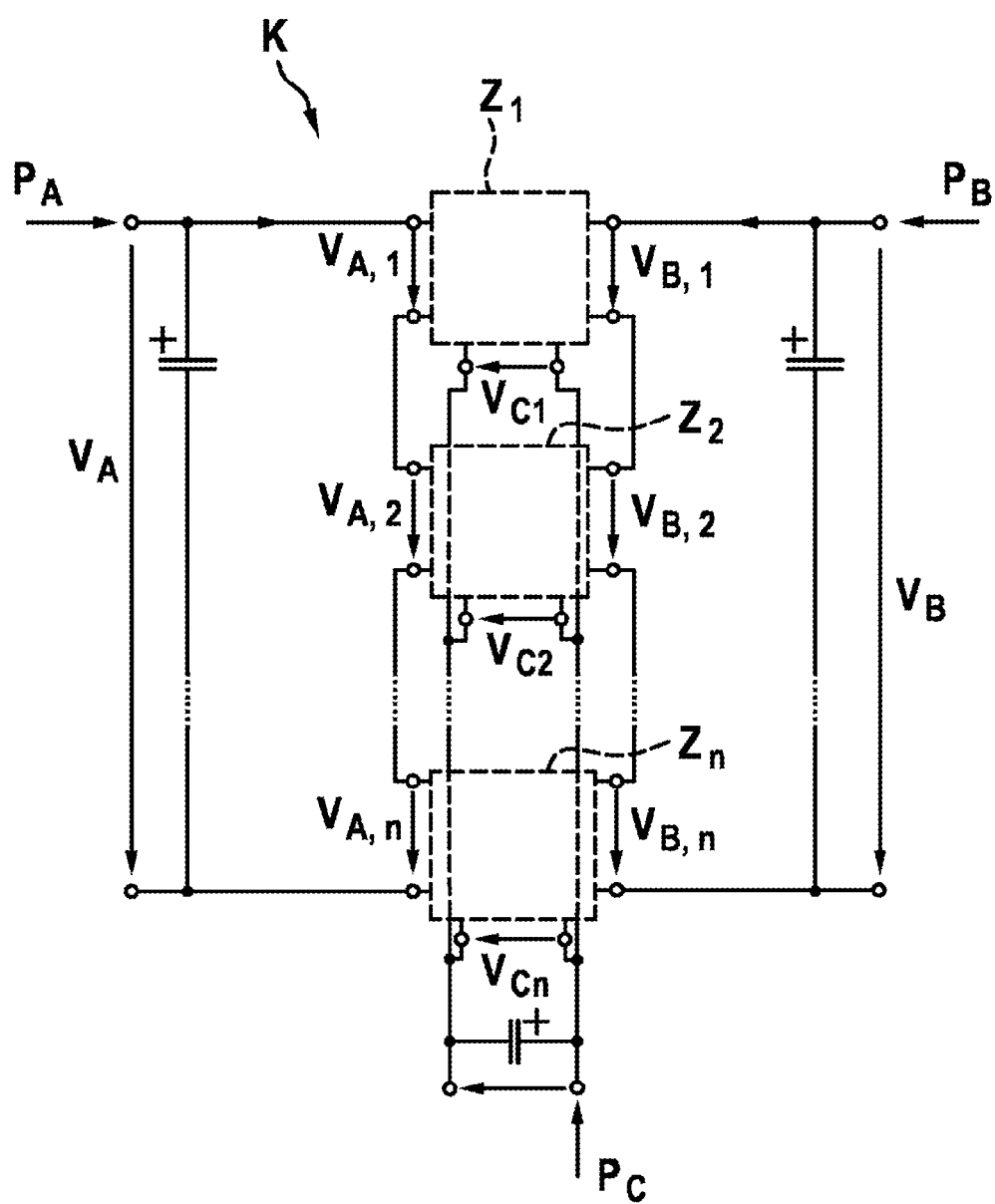
FIG. 5: shows an example of different power inputs at terminals of the converter.
Figure 6:
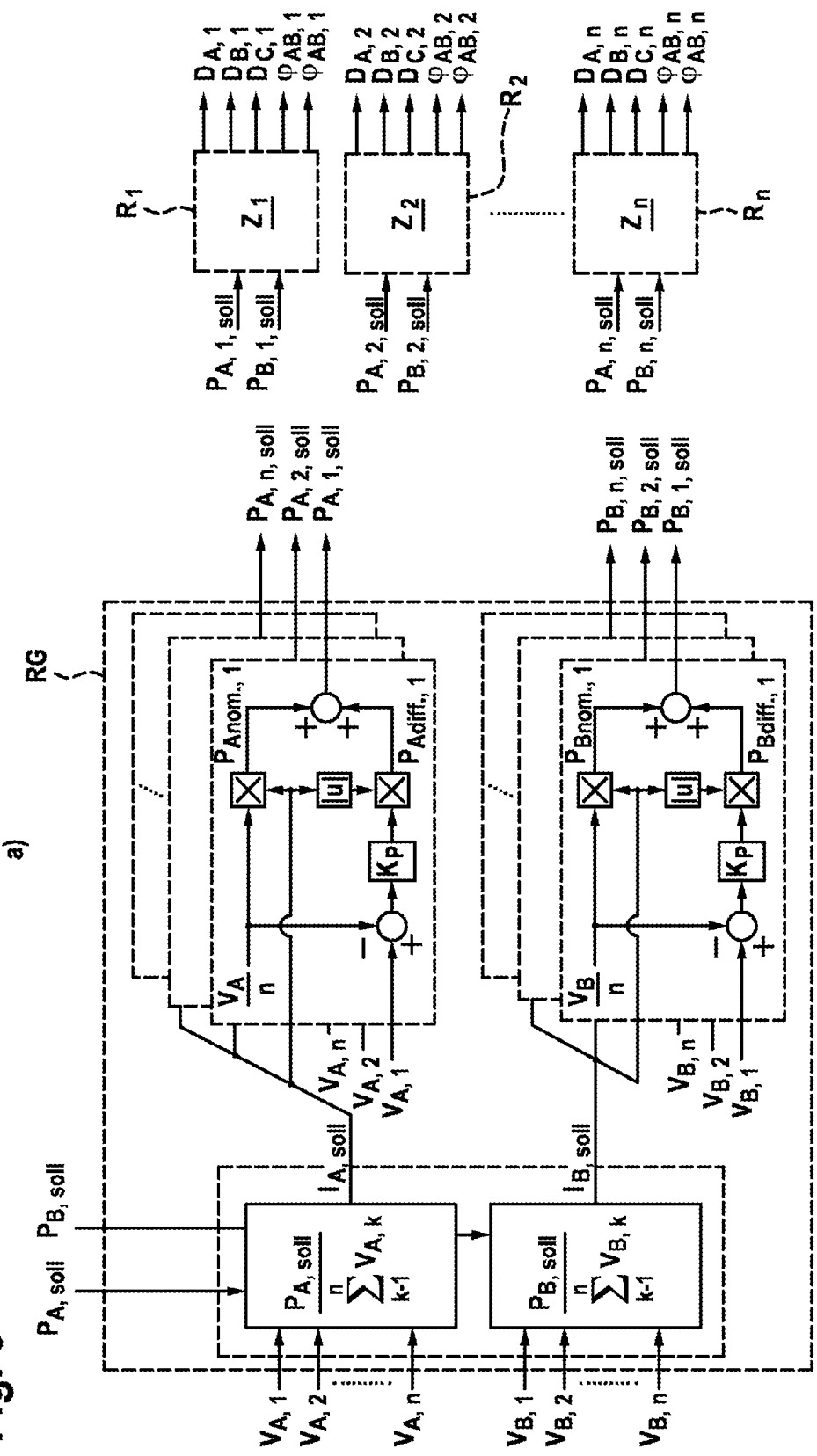
FIG. 6: shows an example of control of the converter with a superordinate regulator.

FIG. 5 shows the power flows $P_{A/B/C}$, which can be adjusted overall by way of the converter K. The adjustment of said power flows is achieved by means of the superordinate regulator RG shown in FIG. 6, which calculates cell powers $P_{A/B/C,k}$ required from the power setpoint values $P_{A/B/C,soll}$ and the measured port voltages $V_{A/B/C,k}$ at the individual converter cells. The cell power setpoint values $P_{A/B/C,k,soll}$ are composed here of two different power components $P_{A/B/Cnom,k}$ and $P_{A/B/Cdiff,k}$. The first term is an average power value, which is the same for each cell and therefore ensures that the demanded total power P is achieved whereas the second power term regulates the individual voltages at the cell ports or cell terminals. For a positive power $P_x$, the cell port power must therefore be increased in the case of an excessively high port voltage in order that the voltage across the cell-internal input capacitor is reduced. This takes place by virtue of more charge flowing from the capacitor than can subsequently flow through the remaining cells. The cell power setpoint values $P_{A/B/C,k,soll}$ are then passed on to the individual regulators $R_k$ of the individual converter cells, which are illustrated in the right-hand part of FIG. 6. The individual regulators $R_k$ then specify the duty cycles $D_{A/B/C}$ and the phase shift angles $\Phi_{AB/AC}$ again for the individual converter cells.

FIG. 7 shows this in an exemplary manner based on a two-cell converter. The converter is intended to transmit a power of 1 kW from terminal A to terminal B, wherein on average no power is intended to flow into or out of terminal C. The system is situated in an asymmetrical state since the input voltage $V_{A,1}$=250 V is greater than $V_{A,2}$=150 V, as a result of which $V_{A,1}$ has to be decreased and $V_{A,2}$ has to be increased. The port voltages of terminal B are distributed symmetrically, as a result of which no voltage adjustment is necessary for these. The regulator now first calculates the required input currents $I_{A,soll}$ and $I_{B,soll}$, which is the same in each case for both cells, and the respectively identical partial powers $P_{Anom,1}=P_{Anom,2}$=500 W and $P_{Bnom,1}=P_{Bnom,2}$=−500 W therefrom. The power correction terms of the converter input A are subsequently calculated by means of the port voltage errors ($V_{A,1}-V_A/2$) and ($V_{A,2}-V_A/2$) and the absolute magnitude of $I_{A,soll}$ to $P_{Adiff,1}$=125 W and $P_{Adiff,2}$=−125 W. The magnitude of the current setpoint value is particularly relevant for negative port powers since a negative port voltage error has to be corrected by a negative power correction term $P_{A/B/Cdiff,k}$, which is only achieved with a positive current setpoint value $I_{x,soll}$. The power correction terms of the converter output B are at 0 W since the port voltages are already distributed symmetrically. The cell power setpoint values from the example are therefore $P_{A,1,soll}$=625 W, $P_{A,2,soll}$=375 W, $P_{B,1,soll}$=500 W, $P_{B,2,soll}$=−500 W, $P_{C,1,soll}$=−125 W and $P_{C,2,soll}$=125 W, which correspond in sum to the requested input power of the total system $P_{A,soll}$=1 kW, to the requested output power $P_{B,soll}$=−1 kW and to the output power $P_{C,soll}$=0 W. Said regulation method accordingly results in the desired stabilization of the input voltages of the cells without changing the input power $P_x$ of the entire system.

Although the average power in the converter terminal C ($P_c$) with 0 W (see FIG. 7) corresponds to the requested power of the entire system, said port is absolutely necessary since the power differences $P_{C,k}$ are balanced by means of said port in order that the aforementioned condition $P_{A,k}+P_{B,k}+P_{C,k}=0$ is again satisfied in each cell.

The cell powers thus obtained are subsequently passed onto the cell-internal regulators, which for their part calculate the corresponding parameters $D_A$, $D_B$, $D_C$, $\Phi_{AB}$ and $\Phi_{AC}$. Symmetrical power distributions and stable operation are therefore guaranteed during converter operation at any time.

The invention claimed is:

1. A converter for controlling power flows between at least three electricity networks, with different operating voltages, the converter comprising: at least three terminals, which are each configured to electrically connect one of the three electricity networks; at least two converter cells each with a transformer having at least three transformer coils, wherein at least one of the terminals is connected to a series circuit of the converter cells, whereas at least another of the terminals is connected to a parallel circuit of converter cells, wherein a third terminal is provided to connect a low-voltage network and is connected to the parallel circuit of the converter cells.

2. The converter as claimed in claim 1, wherein a first terminal A is provided to connect an electricity network and is connected to the a series circuit of the converter cells.

3. The converter as claimed in claim 2, wherein a second terminal is configured to connect a high-voltage network of a motor vehicle and is connected to a circuit of all the converter cells of the converter.

4. The converter as claimed in claim 1, wherein the converter cells have for each transformer coil a terminal connected to a full-bridge, to which the terminal can be connected.

5. The converter as claimed in claim 1, wherein at least one of the three terminals is connected to a capacitor.

6. The converter as claimed in claim 1, wherein all of the converter cells of the converter are of the same design.

7. The converter as claimed in claim 1, having a regulator superordinate to the converter cells.

8. The converter as claimed in claim 7, wherein the superordinate regulator is configured to receive a specification of powers at the individual terminals and to determine, based thereon, the specification of powers for the individual converter cells.

9. The converter as claimed in claim 1, wherein each of the converter cell has a cell regulator.

10. The converter as claimed in claim 9, wherein each cell regulator is configured to adjust the following parameters based on a specification of powers at cell converter ports:

$D_A$, duty cycle at the converter input A $D_B$, duty cycle at the converter input B $D_C$, duty cycle at the converter input C $\Phi_{AB}$ phase shift angle between the converter inputs A and B, and $\Phi_{AC}$ phase shift angle between the converter inputs A and C.

* * * * *